United States Patent
Guzman

(10) Patent No.: US 8,760,346 B2
(45) Date of Patent: *Jun. 24, 2014

(54) COMMAND, CONTROL AND COMMUNICATIONS WITH INTELLIGENT ANTENNAS

(75) Inventor: Jorge Guzman, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 820 days.

This patent is subject to a terminal disclaimer.

(21) Appl. No.: 12/624,018

(22) Filed: Nov. 23, 2009

(65) Prior Publication Data
US 2010/0201571 A1   Aug. 12, 2010

Related U.S. Application Data

(62) Division of application No. 11/431,251, filed on May 10, 2006, now Pat. No. 7,642,960.

(60) Provisional application No. 60/754,544, filed on Dec. 28, 2005.

(51) Int. Cl.
*H01Q 3/00* (2006.01)
*G01S 5/04* (2006.01)

(52) U.S. Cl.
USPC ............................ 342/359; 342/449; 343/757

(58) Field of Classification Search
USPC ............. 342/74, 89, 359, 385, 419, 428, 430, 342/449; 343/757; 455/25
See application file for complete search history.

(56) References Cited

U.S. PATENT DOCUMENTS

| | | | |
|---|---|---|---|
| 5,983,071 A | 11/1999 | Gagnon et al. | |
| 6,499,698 B2 | 12/2002 | Maeda et al. | |
| 7,379,707 B2 | 5/2008 | DiFonzo et al. | |
| 7,454,202 B2 * | 11/2008 | de La Chapelle | 455/427 |
| 7,642,960 B2 * | 1/2010 | Guzman | 342/359 |
| 2002/0021231 A1 * | 2/2002 | Schlager et al. | 340/984 |
| 2003/0080898 A1 * | 5/2003 | Wang et al. | 342/359 |
| 2006/0187117 A1 | 8/2006 | Lee et al. | |
| 2007/0146201 A1 | 6/2007 | Hules et al. | |
| 2008/0148321 A1 * | 6/2008 | Hane et al. | 725/71 |
| 2010/0218224 A1 * | 8/2010 | Gat et al. | 725/72 |

* cited by examiner

Primary Examiner — Dao Phan

(57) ABSTRACT

A system and method to provide a means of communication, command and control between a mobile antenna and a satellite receiver that allows the receiver to send tuning information to the antenna and the antenna to provide feedback to the receiver when a signal has been acquired. The antenna and the receiver can share the appropriate states and status such as diagnostics, test, GPS coordinates, etc.

20 Claims, 4 Drawing Sheets

COMMAND, CONTROL AND COMMUNICATIONS WITH INTELLIGENT ANTENNAS

CROSS-REFERENCE TO RELATED APPLICATIONS

This application is a divisional application of U.S. patent application Ser. No. 11/431,251 filed on May 10, 2006. The entire disclosure of the above application is incorporated herein by reference.

TECHNICAL FIELD

The present invention sets forth a method for exchanging information between an antenna and a satellite receiver so that tuning information and parameters may be exchanged between them.

BACKGROUND

Satellite television has become increasingly popular due to its wide variety of programming. Current DirecTV systems employ an antenna that is fixed to a structure. The antenna is pointed once and secured into place.

Entertainment in automobiles such as DVD players has also become increasingly popular. It would be desirable to provide a satellite television system for a vehicle so that the wide variety of programming may be enjoyed by the rear passengers. In vehicles the antenna must continually move as the vehicle moves to maintain a connection with the satellite receiver. Current satellite receivers do not know information about the antenna and the antenna does not know information about the receiver. Therefore, the time to perform certain tasks may be increased. Currently, mobile satellite service uses standard set top boxes (IRDs). The designs of the IRDs change nearly every year. This increases the challenge for a reliable system particularly in view of the ever-changing antenna designs.

It would therefore be desirable to provide a method and apparatus for performing two-way communications between a receiver and an antenna so that various information may be exchanged between them.

SUMMARY OF THE INVENTION

The present invention allows a mobile antenna to communicate information as to searching, tracking and the acquisition of a good signal to a satellite receiver. Advantageously, this information will provide a minimum disruption to the user and improve the overall perceived quality of the system.

The invention provides a means of communication, command and control between a mobile antenna and a satellite receiver that allows the receiver to send tuning information to the antenna and the antenna to provide feedback to the receiver when a signal has been acquired. The antenna and the receiver can share the appropriate states and stats such as diagnostics, test, GPS coordinates, etc. Various mobile vehicles with satellite receivers such as cars, SUVs, boats RVs, trains and airplanes may benefit from this invention.

Other advantages and features of the present invention will become apparent when viewed in light of the detailed description of the preferred embodiment when taken in conjunction with the attached drawings and appended claims.

DETAILED DESCRIPTION

Figure 1:
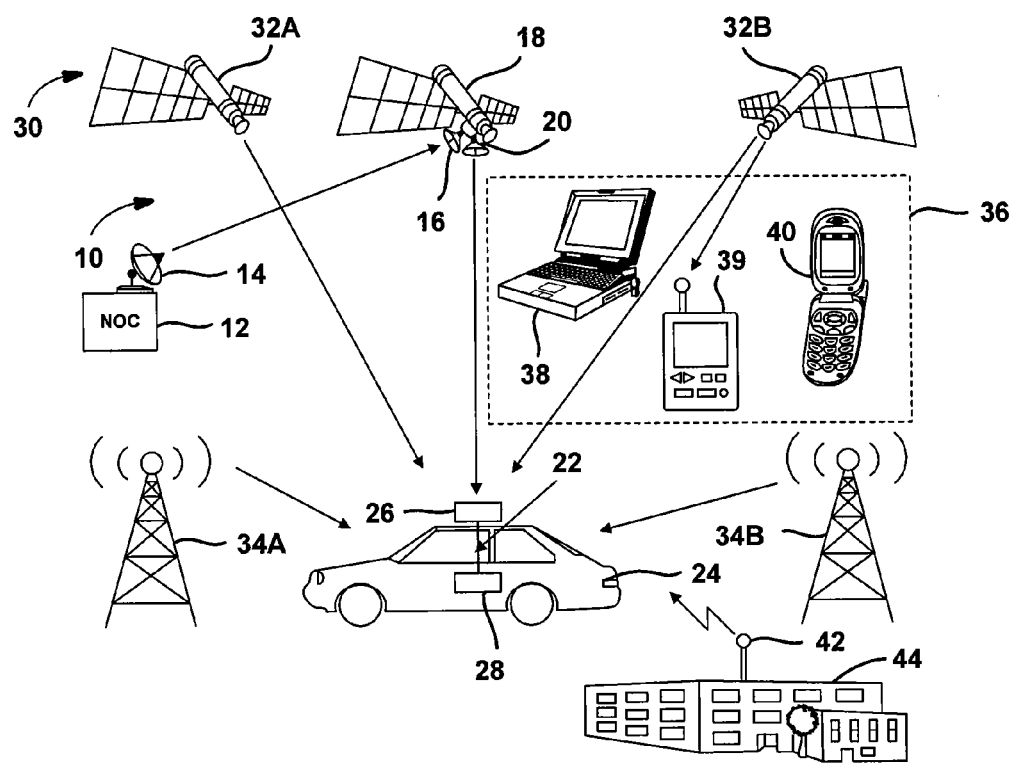
FIG. 1 is a system level view of a satellite broadcasting system according to the present invention.

In the following figures the same reference numerals will be used for the same views. The following figures are described with respect to a mobile satellite television system. However, those skilled in the art will recognize the teachings of the present invention may be applied to various types of mobile reception including land-based type systems.

Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A receiving antenna 26 receives the wireless signals from the satellite 18 and processes the signals in a mobile receiving unit 28. The mobile receiving unit 28 will be further described below.

The system 10 may also receive location signals from a GPS system 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. Cellular phones typically include a GPS locating system. As the vehicle 24 moves about, the exact coordinates in latitude and longitude may be used to determine the proper designated marketing area for local television and broadcasting.

The present invention may also be used for displaying various wireless information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from various other types of broadcasting areas such as an antenna 42 on a building 44. The building 44 may be various types of buildings such as a store and the wireless information transmitted from the antenna 42 may be advertising information. All of the wireless signals preferably include location information transmitted therewith. As will be described below, the information may be coded digitally into the signals. Thus, by reviewing the location information, signals appropriate for the location of the mobile devices may be displayed on the various devices.

Figure 2:
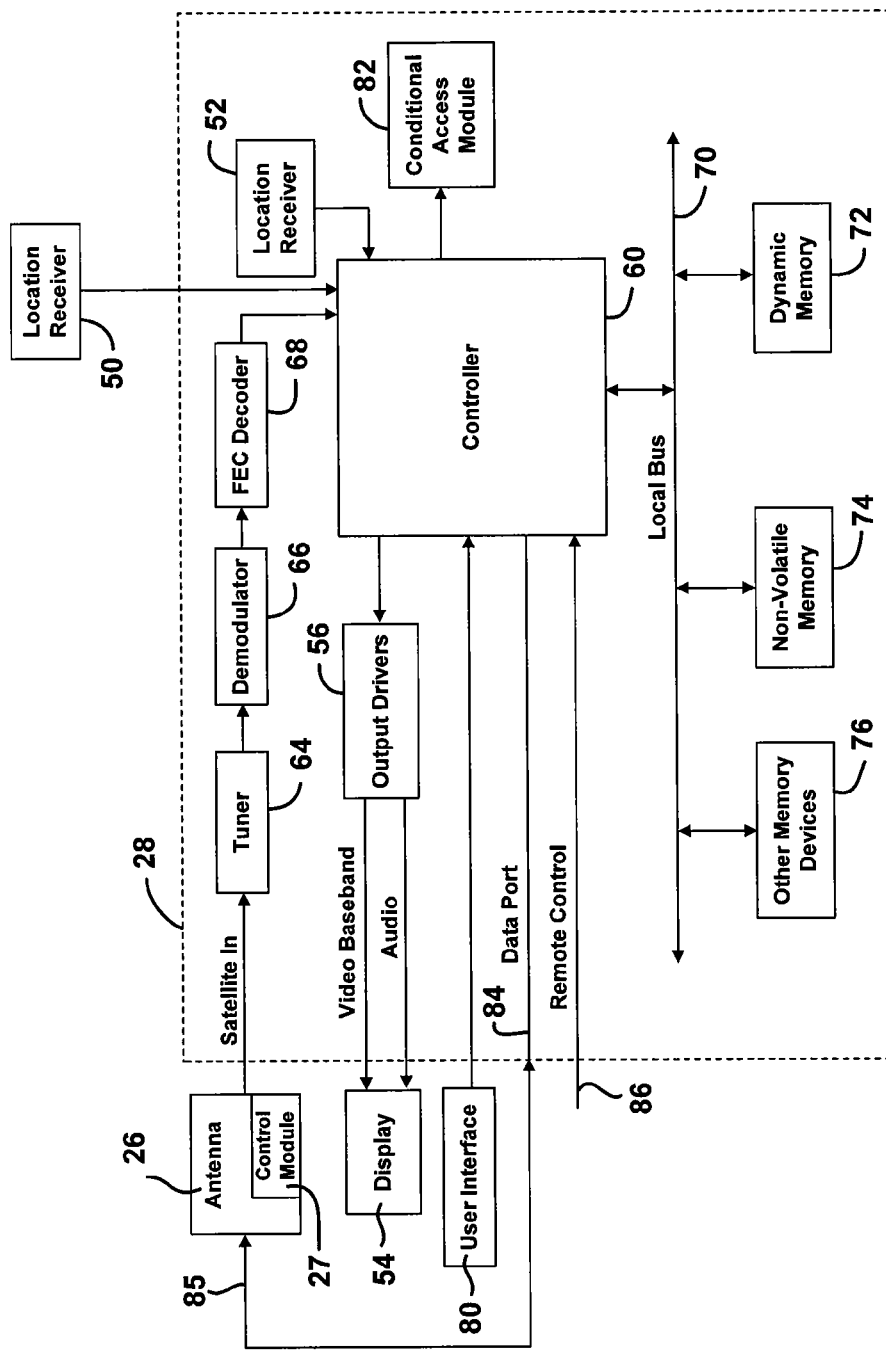
FIG. 2 is a block diagrammatic view of a vehicle having a receiving system according to the present invention.

Referring now to FIG. 2, a receiving system 22 is illustrated in further detail. Antenna 26 may be various types of antennas including a moving or rotating antenna which is used to track the relative movement of the satellite or other transponding devices with respect to the vehicle. The antenna 26 may be a single antenna used for satellite television reception, or a number of antennas such as one for receiving television signals and one coupled to a GPS location receiver 50. The antenna 26 may also be an electronic antenna. As will be further described below, the antenna 26 may two-way communicate information to the mobile receiving unit 28. The two-way communication principles set forth herein may also be applied to stationary antennas.

The antenna 26 may include a control module 27 that controls the communication with the receiving unit 28. The control module 27 may also control the movement of the antenna 26 as the vehicle moves. During operation, the control module 27 generates various types of signals such as information regarding the antenna, timing information and the like as will be described below.

The mobile receiver unit 28 is coupled to antenna 26 with a two-way communication channel such as a wire or a wireless system. The mobile receiving unit 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to location receiver 52 and/or location receiver 50. The mobile receiving unit 28 includes a display 54. The display 54 may be incorporated into the device 36 or within the vehicle 24. The display 54 may include output drivers 56 used for generating the desired audio and video outputs suitable for the particular display 54.

A controller 60 may be a general processor such as a microprocessor. The controller 60 may be used to coordinate and control the various functions of the receiving unit 28. These functions may include a tuner 64, a demodulator 66, a forward error correction decoder 68 and any buffers and other functions. The tuner 64 receives the signal or data from the individual channel. The demodulator 66 demodulates the signal or data to form a demodulated signal or data. The decoder 68 decodes the demodulated signal to form decoded data or a decoded signal. The controller 60 may be similar to that found in current DirecTV set top boxes which employ a chip-based multifunctional controller.

The controller 60 may include or be coupled to a local bus 70. The local bus 70 may be used to couple a dynamic memory 72 such as RAM which changes often and whose contents may be lost upon the interruption of power or boot up. The bus 70 may also be coupled to a non-volatile memory 74. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 76 may also be coupled to local bus 70. The other memory devices may include other types of dynamic memory, non-volatile memory, or may include such devices such as a digital video recorder. The display 54 may be changed under the control of controller 60 in response to the data in the dynamic memory 72 or non-volatile memory 74.

The controller 60 may also be coupled to a user interface 80. User interface 80 may be various types of user interfaces such as a keyboard, push buttons, a touch screen, a voice activated interface, or the like. User interface 80 may be used to select a channel, select various information, change the volume, change the display appearance, or other functions. The user interface 80 is illustrated as part of the mobile receiving unit. However, should the unit be incorporated into a vehicle, the user interface 80 may be located external to the mobile receiving unit such as dial buttons, voice activated system, or the like incorporated into the vehicle and interface with the mobile receiving unit.

A remote control 86 may be used as one type of interface device. The remote control 86 provides various data to the controller 60.

A conditional access module card 82 (CAM) may also be incorporated into the mobile receiving unit. Access cards such as a conditional access module (CAM) cards are typically found in DirecTV units. The access card 82 may provide conditional access to various channels and wireless signals generated by the system. Not having an access card or not having an up-to-date access card 66 may prevent the user from receiving or displaying various wireless content from the system.

An external data port 84 may be coupled to the controller 60 for transmitting or receiving information from a device. The receiving device is illustrated having a data port 84 that is coupled to antenna 26. The data port 84 provides two-way communication between the antenna 26 and the controller 60 through a two-way communication line 85. The connection between the data port 84 and the antenna 26 may be one of a number of types of connections including an RS 232 type connection, a USB connection, a wired connection, a wireless connection or the like. A dedicated port from controller 60 may be used to communicate in addition to other data ports.

Figure 3:
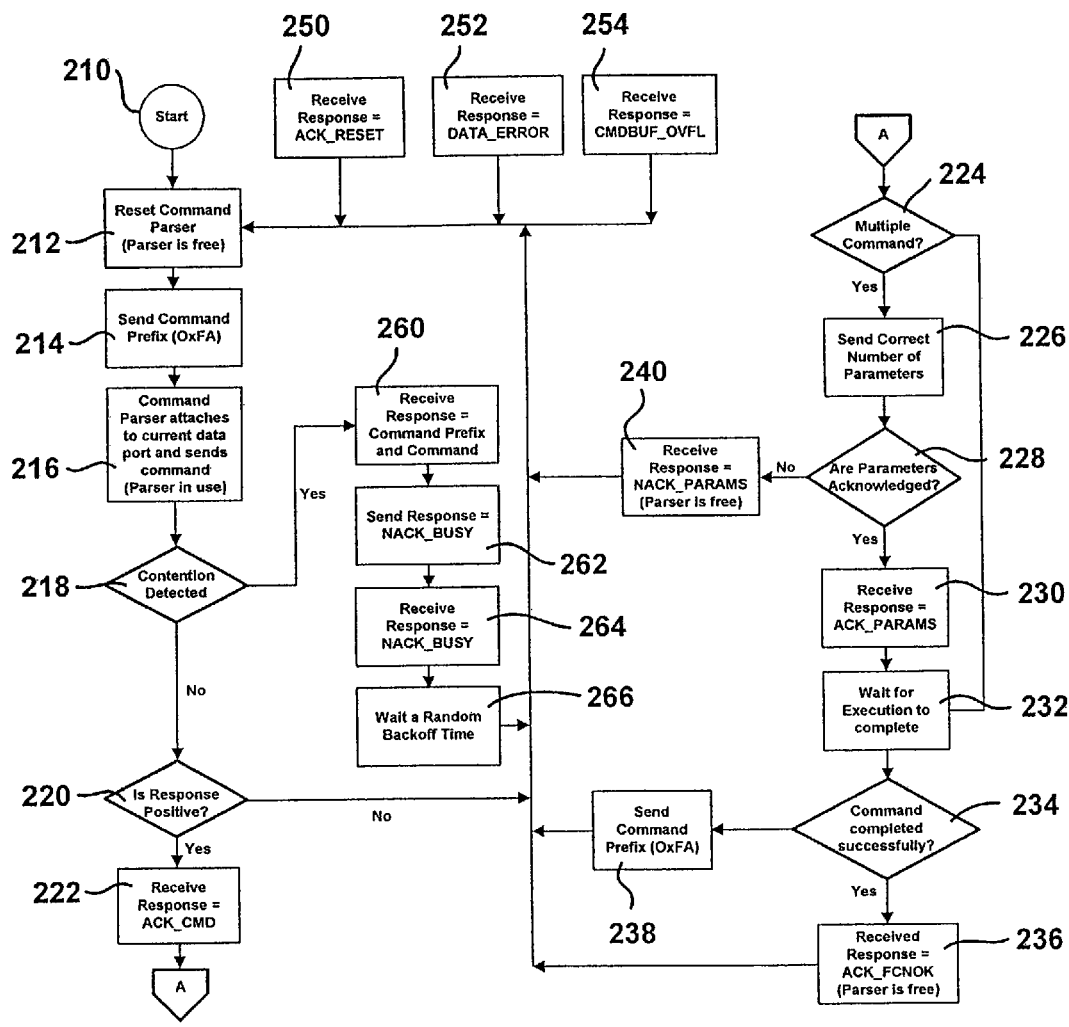
FIG. 3 is a flow chart illustrating a method of storing communicating between an antenna and a receiving unit according to the present invention.

In FIG. 3, step 210 starts the two-way communication system. Handshaking techniques are implemented to ensure proper communications are sent and received. In step 212 a command parser is reset. In step 214, a command prefix is sent from the receiver box to the antenna (or vice-versa). In step 216, the command parser attaches to a data port and sends the command which corresponds to the parser being in use. The command sent provides an alert that the receiving unit is going to send the antenna some information. In step 218, if a contention is not detected, step 220 is executed. A contention is detected when both the receiver unit and the antenna are trying to communicate at exactly the same time. If no contention is detected, a determination of a positive response has been received. If a positive response has been received and the ACK_CMD response is provided, the antenna is acknowledging the command from the receiver unit. In step 224, it may be possible to send a multiple byte command. If a multiple byte command has been sent in step 224, the system proceeds to step 226. In step 226, it is determined whether the correct number of parameters has been sent for the particular command. In step 230, if the response has been received (ACK_PARAMS) the parameters have been properly received by the antenna. In step 224, if a multiple byte command is not provided, or after step 230, step 232 allows the system to execute the desired command. In step 234, it is determined whether the command has been completed successfully. If the command has been completed successfully, a response acknowledging this is provided from the antenna. This response may take the form of an acknowledge function OK command (ACK_FCNOK), and thus the parser is freed in step 236. Referring back to step 234, if the command has not been successfully completed, step 238 is executed in which a no acknowledge signal (NACK_FCNOK).

In step 228, if the parameters have not been acknowledged, a no acknowledge parameter signal is provided (NACK_PARAMS) and step 240 is generated. If a positive response has not been received and a no acknowledge parameter is provided in step 224 or the command is not successfully completed and a no acknowledge function is generated in step 238, step 212 is again executed.

It should be noted that at any time a response such as an acknowledge reset in step 250, a data error in step 252, or a command buffer overflow in step 254 may be received by either device. In either case, the system jumps from where it is in the program loop and resets the command parser in step 212.

Referring back to step 218, if a contention has been detected, step 260 is executed. In step 260, the response command prefix and command may be received. To indicate a contention, a response of no acknowledge busy (NACK_BUSY) may be provided in 262 or in step 264 a no acknowledge busy response (NACK_BUSY) may be received. In step 266, a wait for a random backoff time may be performed while another try is made at generating a communication. By waiting a random time, the two devices will likely not try to communicate simultaneously. After step 266, step 212 is executed in which the command parser is reset.

Figure 4:
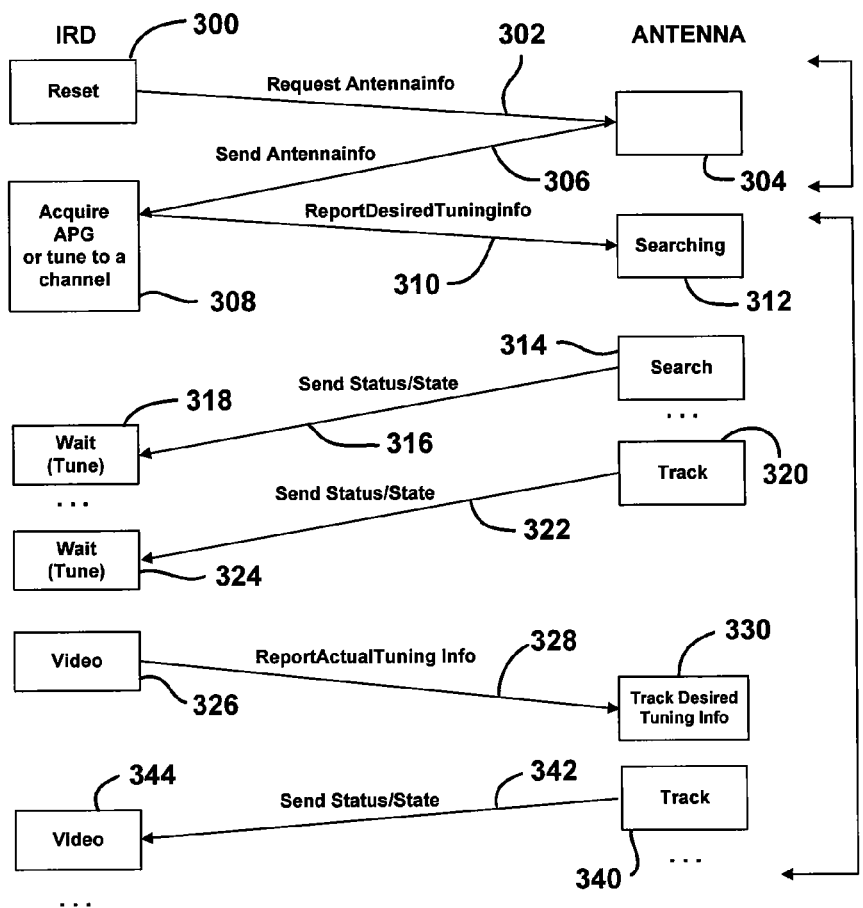
FIG. 4 is a signaling chart illustrating a method for communicating according to the present invention.

Referring now to FIG. 4, a communication diagram of the handshaking between the module antenna and receiver is set forth. As an overview, there are three main states: boot-up, program guide acquisition, and channel tuning. A summary of each is set forth below:

Boot Up
  Once the receiver comes out of reset and starts executing, it will wait for capabilities and other information from the antenna.
  Upon reception of AntennaInfo, the receiver checks the antenna capabilities and enables two-way communications with the antenna.
Program Guide Acquisition—Boot Stage
  During Program Guide Acquisition boot, the receiver tunes to different transponders and possibly different satellites. The receiver will make use of the ReportDesiredTuningInfo to indicate to the antenna the required satellite and transponder. This process is the same as when tuning to a video channel (see Channel Tuning below).
Channel Tuning
  When tuning to a channel, the receiver will make use of the ReportDesiredTuningInfo to indicate to the antenna the required satellite and transponder.

The antenna receives the command and sends back a status/state response. It scans for the appropriate satellite.
  The receiver waits for a status that indicates the antenna has completed its process to track the appropriate satellite.
  The receiver acquires further information from the satellite to confirm that the antenna is tracking correctly and sends back ReportActualTuningInfo.
  The receiver and antenna exchange status/state information until the next channel change.

In FIG. 4, a boot-up phase of the system is illustrated. The left side illustrates the receiving device or IRD and the right illustrates an antenna. During boot up the IRD may send a request antenna information request to the antenna or the antenna may send its information to the receiver box without prompting. The receiving device generating a request is provided in box 300 and transmits the request antenna information signal in step 302 to the antenna 304. The antenna may respond with antenna information in step 306. In box 308, the receiving device may request or send various tuning information such as it desires to receive the automatic program guide (APG) or it may be desired to tune to a new channel. This is illustrated in step 310, report desired tuning info. In box 312, the antenna may search for the particular satellite or the like. In box 314 the antenna may send a status state in step 316 to the receiving device in step 318. In step 320, the antenna may also provide tracking information or the like with a send status state signal in step 322 to the receiving device in step 324. In step 326, the receiving device may report actual tuning information in step 328 to the antenna 330 in which the desired tuning information is tracked. This may be due to a channel change or the like. This may be performed when a successful tuning to a particular channel is performed. Every once in a while the antenna may provide information in step 340 by providing a send status state signal 342 to the IRD 344. This may be performed every once in a while such as every 30 seconds, or every time a status changes.

A list of various commands is provided in Table 1. The "get" commands are commands that the antenna or receiver generates to request information. The report commands are commands that provide information to the other device. Thus, as can be seen, two-way communication between a receiver and an antenna is provided in the present invention. This allows the tuner or receiving device to have information as to the status of the antenna. The antenna also has information regarding the status of the receiving device.

TABLE 1

| Command | Description |
| --- | --- |
| GetDesiredTuninginfo | Command signal generated by the antenna. The receiver responds with desired (not tuned yet) tuning information. |
| GetActualTuninginfo | Command signal generated by the antenna. The receiver responds with the actual tuning information. |
| SetAntennainfo | This command signal sets the antenna information within the receiver which allows the receiver to enable/disable related features. |
| ReportAntennaState | The antenna provided status information signal to the receiver. |
| GetReceiverStatus | This command signal gets the state of the receiver. |
| GetCurPrograminfo | This command signal retrieves the programming information associated with the current channel. |
| Getreceiverinfo | This command signal gets information about the receiver. |
| ReportGPSLocation | This command signal informs the receiver of the current GPS location. |
| ReportDesiredTuninginfo | Command signal generated by the receiver any time there is a channel change. Desired tuning information is provided with command. |

TABLE 1-continued

| Command | Description |
|---|---|
| ReportActualTuninginfo | Command signal generated by the receiver any time there is a channel change and the receiver has tuned successfully to a channel. |
| GetAntennaDiagnostic | Command signal generated by the receiver to retrieve and display antenna diagnostics information. |
| GetAntennaInfo | Command signal generated by the receiver to retrieve and display antenna information. |

While particular embodiments of the invention have been shown and described, numerous variations and alternate embodiments will occur to those skilled in the art. Accordingly, it is intended that the invention be limited only in terms of the appended claims.

What is claimed is:

1. A receiving system comprising:
a receiver that generates a first communication signal; and
an antenna having an antenna control module that receives the first communication signal, said antenna control module generating a response communication signal corresponding to an antenna status and communicating the response communication signal to the receiver in response to the first communication signal.

2. A system as recited in claim 1 wherein the receiver is a mobile satellite receiver.

3. A system as recited in claim 1 wherein the antenna comprises a satellite antenna.

4. A system as recited in claim 3 wherein the satellite antenna is a movable antenna.

5. A system as recited in claim 1 wherein two-way communicating comprises handshaking between the antenna and the receiver.

6. A system as recited in claim 1 wherein the receiver comprises a controller having a data port.

7. A system as recited in claim 6 wherein said antenna is coupled to the data port with a wire.

8. A method of operating a system comprising:
resetting a receiver;
requesting antenna information from an antenna;
reporting the information to the receiver;
communicating desired tuning information from the receiver to the antenna; and
communicating a tuning status from the antenna to the receiver.

9. A method as recited in claim 8 wherein communicating desired tuning information comprises requesting a program guide.

10. A method as recited in claim 8 wherein resetting comprises starting or powering a receiving device.

11. A method as recited in claim 8 wherein resetting a receiver comprises resetting a satellite receiver.

12. A method as recited in claim 8 wherein requesting antenna information from an antenna comprises requesting satellite antenna information from a satellite antenna.

13. A receiving system as recited in claim 1 wherein further comprising a wired communication line coupling the antenna and the receiver, said wired communication line communicating the first communication signal therethrough.

14. A receiving system as recited in claim 1 wherein the first communication signal comprises an antenna information request and wherein the response communication signal comprises an antenna information signal.

15. A receiving system as recited in claim 14 wherein the receiver generates the antenna information request signal during boot-up.

16. A receiving system as recited in claim 1 wherein the first communication signal comprises a desired tuning information signal, and wherein the response communication signal comprises an antenna status tuning information signal.

17. A receiving system as recited in claim 16 wherein the receiver generates desired tuning information signal during a program guide acquisition stage.

18. A receiving system as recited in claim 16 wherein the receiver generates the desired tuning information signal during a channel tuning stage.

19. A receiving system as recited in claim 16 wherein the receiver generates the desired tuning information signal during a channel tuning stage, and wherein antenna control module generates a response communication signal corresponding to an actual tuning information signal.

20. A receiving system as recited in claim 16 wherein the receiver generates desired tuning information signal during a program guide boot stage.

* * * * *